April 12, 1932. L. M. WOOLSON 1,853,712
INTERNAL COMBUSTION ENGINE
Filed June 19, 1929 2 Sheets-Sheet 1

Inventor
LIONEL M. WOOLSON.
By *Nullon Tilletz*
Attorney

April 12, 1932. L. M. WOOLSON 1,853,712
INTERNAL COMBUSTION ENGINE
Filed June 19, 1929 2 Sheets-Sheet 2

Inventor
LIONEL M. WOOLSON
By Milton Tillets
Attorney

Patented Apr. 12, 1932

1,853,712

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed June 19, 1929. Serial No. 371,981.

This invention relates to internal combustion engines and more particularly to engines in which the cylinders are angularly related.

An object of my invention is to provide a compact and light internal combustion engine which will develop a high horse power.

Another object of the present invention is to provide an improved fuel oil conducting system for internal combustion engines wherein the fuel oil is moved from a source of supply to the several cylinders.

A further object of the invention is to provide a fuel feeding system for an internal combustion engine of the multi-bank radial type in which the fuel is fed from a source of supply to the cylinders by devices individual thereto.

Other objects of the invention will appear from the following description taken in connection with the accompanying drawings forming a part of the specification in which.

Figure 1:
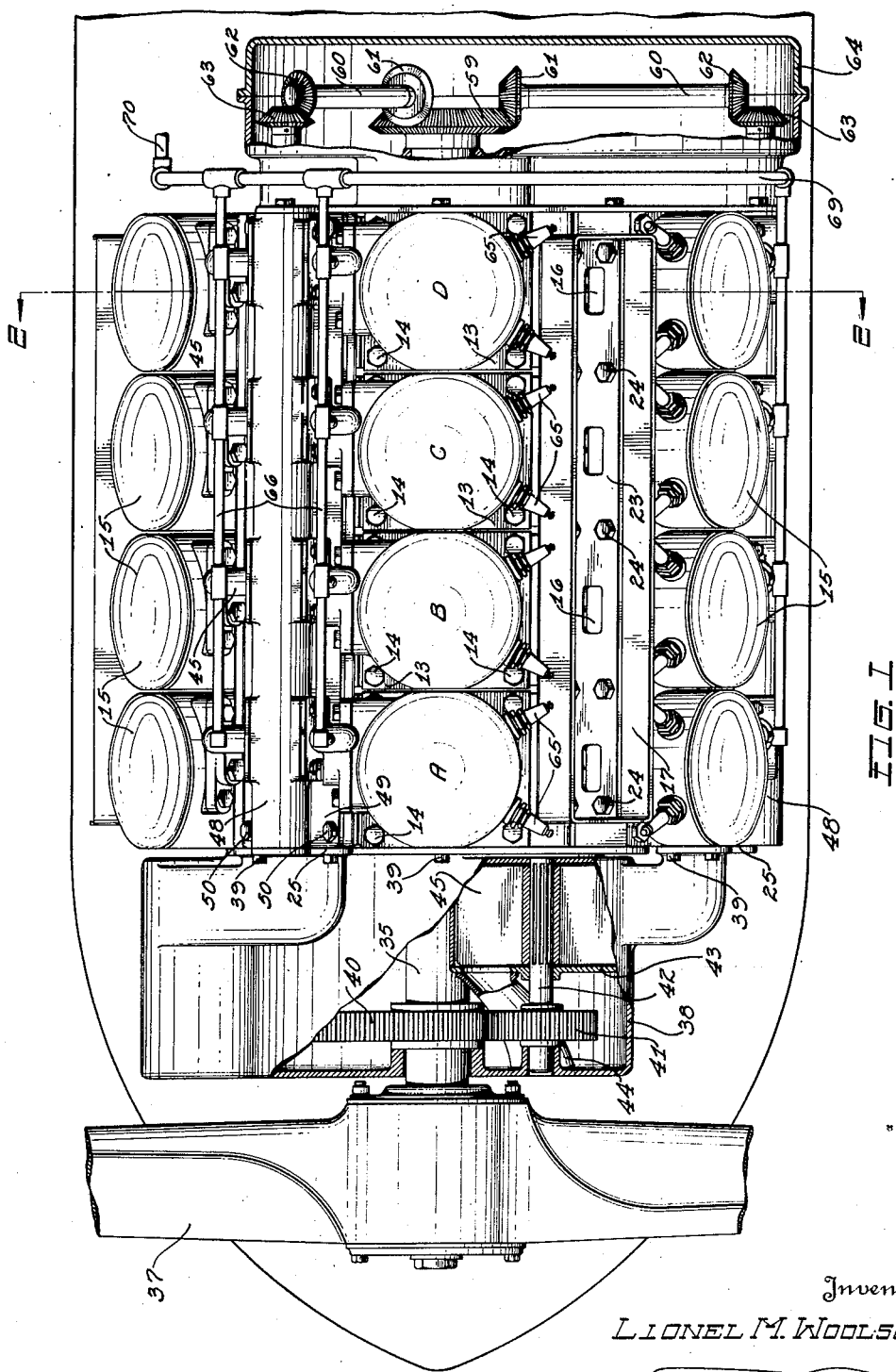
Fig. 1 is a side elevational view of an internal combustion engine incorporating the present invention.
Figures 2, 3:
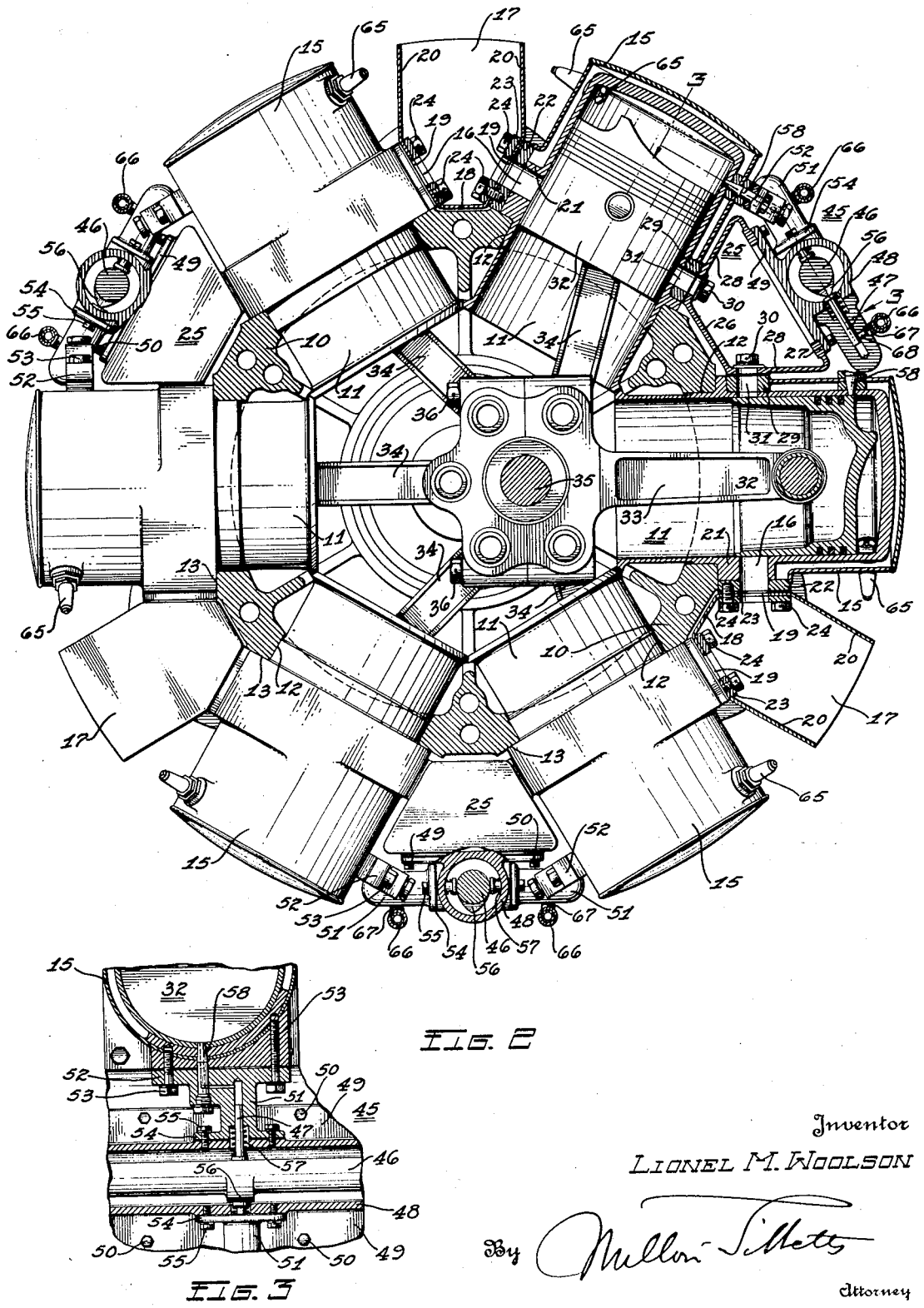
Fig. 2 is a sectional view of the same taken on line 2—2 of Fig. 1.
Fig. 3 is a fragmentary sectional view taken on line 3—3 of Fig. 2.

In the drawings, 10 represents a cylindrical crank case from which extends a plurality of banks of radial cylinders 11, arranged in longitudinal alignment as designated by A, B, C and D. There are six cylinders in each bank, and while any number of cylinders can be used, I prefer that they be of an even number, and as shown there are six cylinders in each set, so that there is a total of twenty-four. The engine is of the two-cycle type, and hence there is no overhead valve mechanism so that the frontal area of the engine is small in proportion to power developed. Further, by arranging such sets of cylinders in alignment only a minimum longitudinal space for the engine is required, and results in a very compact structure. This arrangement of the cylinders permits the utilization of a single inlet manifold and a single exhaust manifold for every two adjacent cylinders in each bank which can be arranged longitudinally within the angle formed between the longitudinal rows of cylinders.

The crank case is provided with apertures 12 into which the cylinders project, flanges 13 extending from the cylinders are secured against the casing by the bolts 14. Each cylinder is provided with a water jacket 15 and between the cylinders and the jackets, water is circulated in circuit with a radiator (not shown). Exhaust ports 16 extend through adjacent walls of each pair of cylinders and in longitudinal alignment relative to the banks of cylinders, so that three manifolds 17 can be arranged to connect with all of the cylinders. Such manifolds are each preferably formed of sheet metal bent to form a base 18 and angular sides 19 and parallel extensions 20. The angular sides of the manifolds are secured against plates 22 which are welded to bosses 21 extending from the cylinders, plates 23 being arranged interiorly of the manifolds parallel to the plates, and secured with the manifolds to the cylinders by bolts 24.

Air inlet manifolds 25 are arranged between the pairs of cylinders and extend longitudinally of the cylinder sets so that three manifolds will suffice for all twenty-four cylinders. Such manifolds are preferably formed of sheet metal bent to provide parallel base and outer walls 26 and 27 respectively joined by angularly disposed side walls 28, the manifolds being formed to fit closely between the angularly disposed adjacent pairs of cylinders. The cylinders have plates 29 welded thereto and the side walls of the air intake manifolds are secured to such plates by the bolts 30. Air inlet ports 31 extend through the manifolds, plates and cylinder walls, such ports serving to admit air into the cylinders for the combustion charge and also for scavenging the burnt gases resulting after combustion.

Pistons 32 are reciprocably mounted in the cylinders, such pistons being of the type used with two-cycle engines. The pistons of each radial set are secured to a master rod 33 to which are pivotally connected the link rods 34 connected to the other five pistons of each set. The master rods are split and secured together around crank throws of the crank shaft 35 by the bolts 36. The crank shaft extends beyond both ends of the engine casing and a propeller 37 is secured to the extreme forward end of the propeller, while a blower and housing 38 therefor are arranged intermediate the propeller and the forward end of the engine casting. The blower housing provides a closure which is secured to the engine by bolts 39. The crank shaft extends through the blower housing and is provided with gears 40 which mesh with the gears 41 secured to fan shafts 42 rotatably carried by bearings at each end of the housing. There are three fan casings 43 arranged within the housing which are each connected with one of the air manifolds leading to the cylinders. Such casings also have an air inlet conduit 44 opening through the front wall of the housing. One of the fan shafts extends through each casing and fans 45 are secured to such shafts within the casings. It will be seen that the entire blower structure is of less frontal area than the engine, and is arranged to supply air to the cylinders under pressure, for both the fuel mixture charge and for scavenging the cylinders. The blower housing, further, serves as a support for the forwardly projecting end of the crank shaft upon which the propeller is mounted, the advantage of such a bearing for the crank shaft is obvious.

I propose to introduce air and liquid fuel separately into the cylinders where they are intermingled to provide the fuel charges. To this end, I associate a high pressure nozzle pump structure 45 with each cylinder for injecting atomized liquid fuel under high pressure into the working chamber. In order to simplify the mechanism, the injection devices are arranged above the air inlet manifolds, so that a single cam shaft 46 can be utilized to operate the pumps 47 of each pair of cylinders, and in this manner three cam shafts are arranged to operate all of the fuel injection pumps. The cam shafts 46 are enclosed in longitudinally extending housings 48 having flanges 49 secured upon the outer wall of the air inlet manifolds by the bolts 50. Pump casings 51 are provided with flanges 52 secured to the cylinders by bolts 53, and with flanges 54 which are secured to the opposite sides of the cam shaft casings by bolts 55. The pump casings have a barrel portion in which the pumps project, one end of the pumps extending into the shaft housings and engaging the cams 56, coil springs 57 being associated with the pumps and pump housings causing the pumps to continuously engage the cam shaft. The pump casings are provided with ducts leading from the pump barrels to the nozzles 58 which project into the working chambers, suitable valve means being provided at the nozzle end to atomize the fuel entering the cylinders.

For driving the cam shafts, I provide a bevel gear 59 at the rear end of the crank shaft which drives the counter shafts 60 through the gears 61 fixed to one end thereof, while gears 62 fixed to the other or outer ends of the counter shafts mesh with the gears 63 fixed to the rear ends of the cam shafts. A housing 64 secured to the rear end of the engine casing encloses the rear ends of the cam shafts, and the driving mechanism therefor. Rotation of the cam shafts will cause reciprocation of the fuel pumps, so that liquid fuel will be sprayed into air charges being compressed in the cylinders. The fuel injection is preferably completed before the pistons complete their pressure strokes and the compressed air and atomized fuel are mixed through turbulence in the cylinders prior to ignition. Each cylinder is provided with dual ignition, which is in the form of spark plugs 65 connected with a suitable source of electrical energy (not shown). The charge could, however, be ignited through heat of compression if desired. By the arrangement of cams, ignition and master rods, a desired firing order of the cylinders can be established.

Arranged between pairs of cylinders and substantially parallel to the cam shafts, I extend a pair of fuel supply pipes 66, the forward ends of which are closed, such pipes being connected by unions 67 with ducts 68 in the pump casing. A circular manifold 69 is connected with the rear ends of the pairs of fuel supply pipes, and is provided with an inlet feeding connection 70, which connects with a reservoir and low pressure pump (not shown). Such fuel supply means is arranged within the sectional area of the engine.

Through the utilization of the accessories associated with the pairs of aligned cylinders, the engine is extremely light and reduces the opportunity for trouble. The arrangement of the cylinders and their accessories lends toward a very compact engine which will offer a minimum resistance to progress. By the method of operation, and the arrangement of the structure, a very high horse power per pound of weight can be developed.

Various changes can be made in the details of construction and operation described herein without departing from the spirit of the invention and the scope of the claims.

What I claim is:

1. In an internal combustion engine, a plurality of aligned banks of radial cylinders, a fuel injection device associated with each cylinder, a fuel feeding manifold for each aligned row of cylinders connected to the injection devices, and a fuel supply manifold connected to the feeding manifolds.

2. In an internal combustion engine, a plurality of aligned banks of radially extending cylinders, a high pressure fuel injection device associated with each cylinder, parallel fuel manifolds connected with the injection devices of aligned rows of cylinders, a circular manifold at one end of the engine, said circular manifold being connected with the parallel manifolds, and means for conducting liquid fuel to the circular manifold.

In testimony whereof I affix my signature.

LIONEL M. WOOLSON.